UNITED STATES PATENT OFFICE.

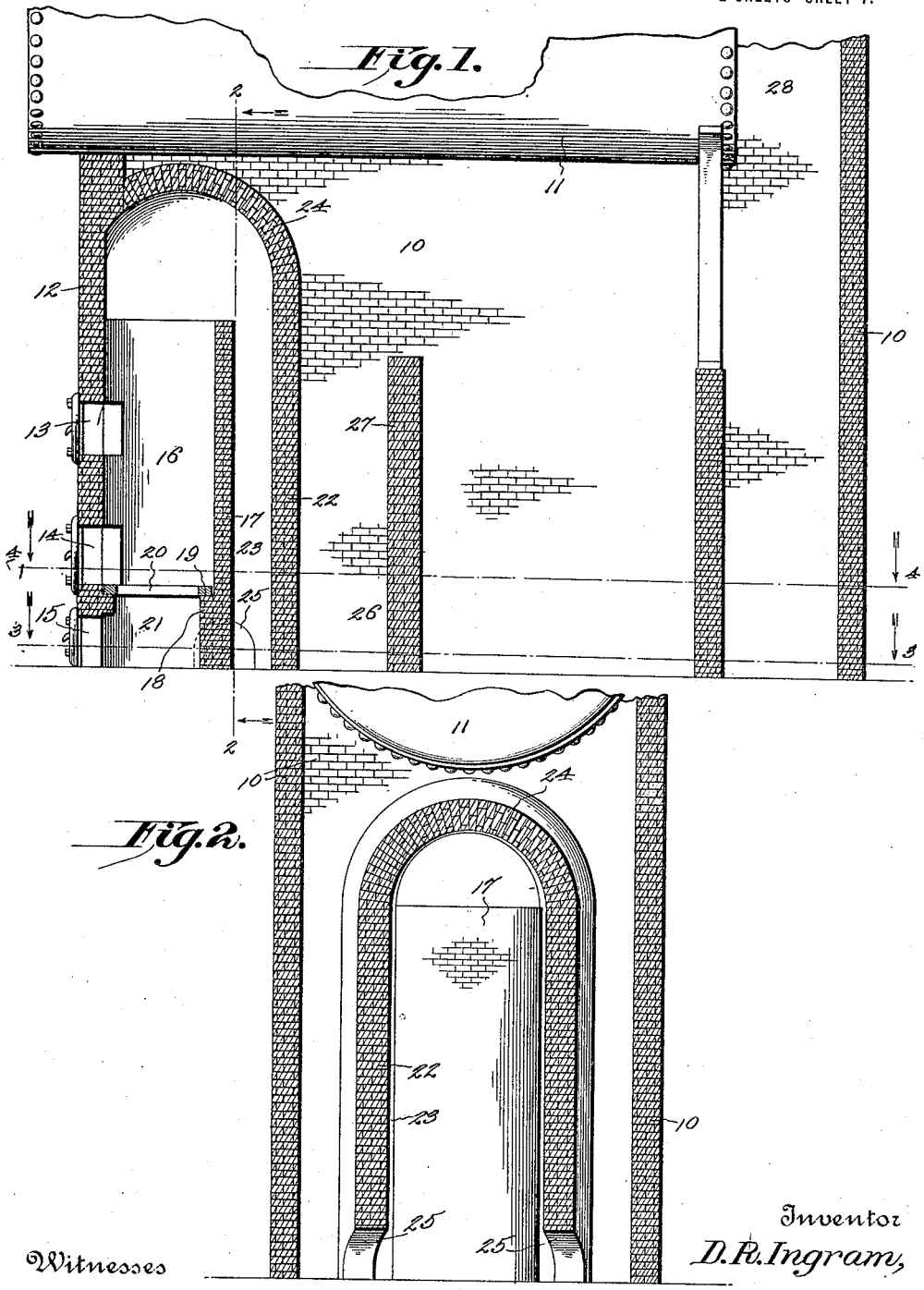

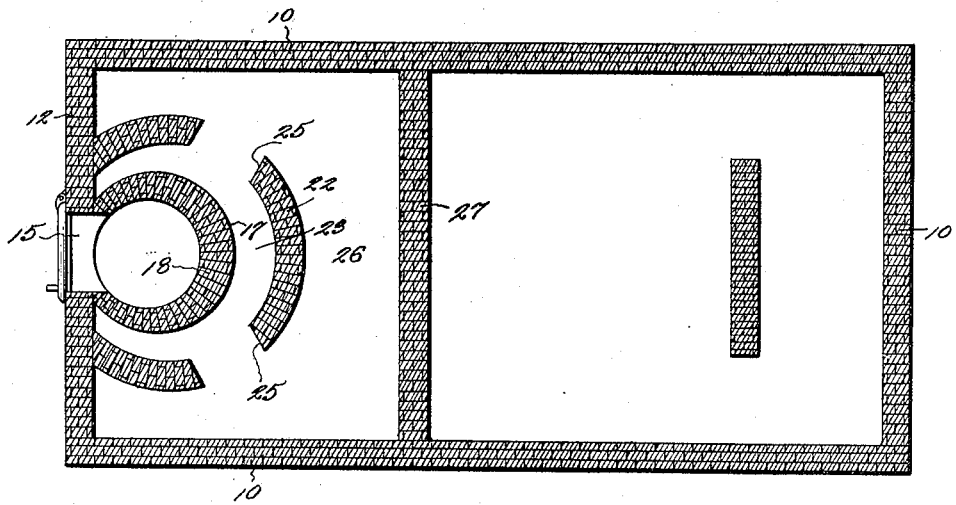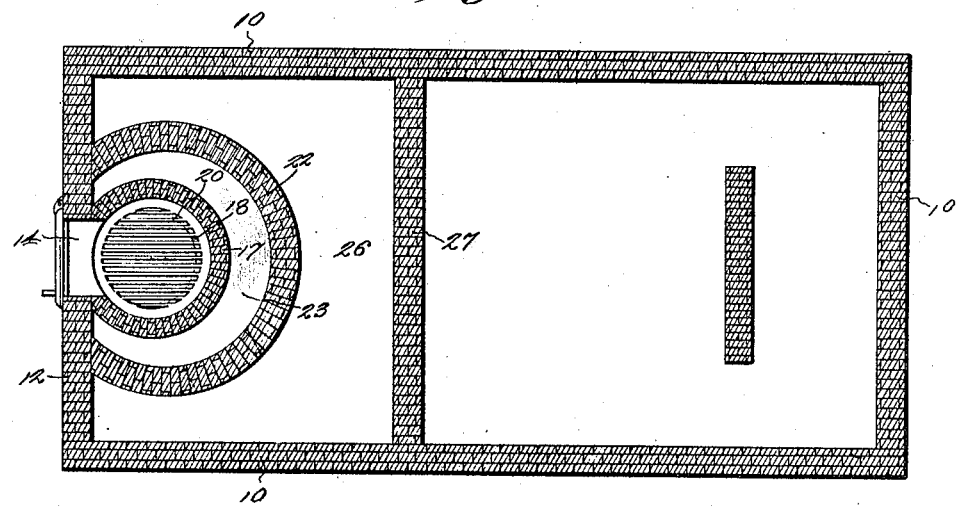

DAVID R. INGRAM, OF ELKINS, WEST VIRGINIA.

FURNACE CONSTRUCTION.

1,326,060. Specification of Letters Patent. Patented Dec. 23, 1919.

Application filed April 14, 1919. Serial No. 289,882.

*To all whom it may concern:*

Be it known that I, DAVID R. INGRAM, a citizen of the United States, residing at Elkins, in the county of Randolph and State of West Virginia, have invented new and useful Improvements in Furnace Construction, of which the following is a specification.

This invention relates to furnace construction, the object being to provide a furnace in which the products of combustion are entirely consumed, whereby a maximum of heat units is obtained from a given amount of fuel.

Another object of the invention is the provision of a boiler in which cold air entering the combustion chamber, when firing, will be prevented from reaching the boiler, said air traveling through heat collecting chambers where it is properly heated before reaching the flues.

Other objects and advantages of the invention will appear as the following description is read in connection with the accompanying drawings.

In the drawings:

Figure 1 is a central longitudinal sectional view through a furnace constructed in accordance with the present invention.

Fig. 2 is a sectional view on the line 2—2 of Fig. 1.

Fig. 3 is a similar view on the line 3—3 of Fig. 1.

Fig. 4 is a like view on the line 4—4 of Fig. 1.

Referring to the drawings in detail, like characters of reference denote corresponding parts throughout the several views.

The furnace, which comprises the present invention, is formed of the usual walls 10, which in the present instance support a boiler 11, shown as of the return flue type. The front wall 12 of the furnace is provided with the usual openings, which includes a feed opening 13, a clean out opening 14 and an ash pit opening 15, all of which are provided with suitable doors.

The combustion chamber is shown at 16 and is formed of a substantially circular vertically disposed wall 17, whose lower end is increased in thickness, as shown at 18, for the purpose of providing a ledge or shoulder 19. This ledge or shoulder supports a grate 20, which is positioned over the ash pit 21.

The wall 17 of the combustion chamber is of an appreciable height and is surrounded by a substantially circular wall 22, which is spaced from the wall 17 to provide an additional combustion chamber 23. The wall 22 provides a casing, the top of which is preferably dome shaped and semi-spherical, as indicated at 24, so that the products of combustion rising from the chamber 16 will be deflected downwardly into the combustion or heat collecting chamber 23, provided between the walls 17 and 22. As the wall 17 is brought to an intense heat by the fire in the chamber 16, the gases and smoke passing from this chamber will be directed downwardly into the chamber 23, where they will be maintained at ignition temperatures by the heat from the wall 17 and further consumed.

Located near the bottom of the wall 22, are outlets 25, through which the products of combustion pass and enter another combustion chamber 26 formed by the wall 22 and by a baffle wall 27 extending transversely across the furnace. The passage of the products of combustion is retarded by the wall 27 and they are again ignited by the intense heat thrown off from the wall 22, so that all of the gases and smoke passing from the combustion chamber are entirely consumed before leaving the chamber 26, the heat therefrom rising for contact with the boiler 11. The usual draft flue 28 is provided to insure proper combustion.

From the foregoing it will be seen that the products of combustion leaving the chamber 16 are consumed in their passage through the chamber 23 and are retarded by the wall 27, which provides a further combustion chamber, as before explained. In addition, cold air is prevented from reaching the boiler when the door 13 of the furnace is open for the purpose of heating, thus overcoming a well known objectionable feature. This is effected by causing the cold air, which enters the chamber 16, to pass through the heat collected in the chambers 23 and 26, so that by the time the boiler 11 is reached the air will be properly heated.

A further advantage of the invention resides in the fact that as the gases and smoke are entirely consumed the formation of soot within the boiler flues is eliminated, rendering the flues more susceptible to heat and preventing the necessity of further cleaning.

The invention is susceptible of various changes in its form, proportions and minor details of construction and the right is herein reserved to make such changes as properly fall within the scope of the appended claim.

Having described the invention, what is claimed is:

A furnace including an outer casing, a circular combustion chamber therein, said chamber being open at the top, a wall surrounding the combustion chamber and spaced therefrom, said wall conforming in horizontal outline to the outline of the combustion chamber, a semi-spherical dome upon said wall, said dome being spaced above the walls of the combustion chamber to provide communication between said chamber and the space surrounding the same and to direct the products of combustion downward into said space, the surrounding wall having openings located in the bottom in opposite sides thereof and a baffle wall connecting the side walls of the outer casing to provide a casing surrounding the last mentioned wall, said baffle wall terminating short of the top of the outer casing.

In testimony whereof I affix my signature.

DAVID R. INGRAM.